United States Patent
Ayers et al.

(10) Patent No.: US 10,004,979 B2
(45) Date of Patent: Jun. 26, 2018

(54) SENSOR DATA AVAILABILITY FROM REMOTE DEVICES

(71) Applicant: Microsoft Technology Licensing, LLC, Redmond, WA (US)

(72) Inventors: Justin Ayers, Maple Valley, WA (US); George Roussos, Seattle, WA (US); Paul Wang, Beijing (CN); Chunshui Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 640 days.

(21) Appl. No.: 14/633,000

(22) Filed: Feb. 26, 2015

(65) Prior Publication Data

US 2016/0255153 A1   Sep. 1, 2016

(51) Int. Cl.
| | |
|---|---|
| A63F 13/21 | (2014.01) |
| A63F 13/23 | (2014.01) |
| H04W 4/38 | (2018.01) |
| H04L 29/08 | (2006.01) |
| A63F 13/00 | (2014.01) |

(Continued)

(52) U.S. Cl.
CPC .............. *A63F 13/21* (2014.09); *A63F 13/00* (2013.01); *A63F 13/23* (2014.09); *H04L 67/12* (2013.01); *H04L 67/16* (2013.01); *H04Q 9/00* (2013.01); *H04W 4/38* (2018.02); *H04L 29/08558* (2013.01); *H04Q 2209/43* (2013.01); *H04W 4/80* (2018.02); *H04W 52/0251* (2013.01); *Y02D 30/40* (2018.01); *Y02D 70/00* (2018.01); *Y02D 70/142* (2018.01); *Y02D 70/144* (2018.01); *Y02D 70/164* (2018.01); *Y02D 70/166* (2018.01)

(58) Field of Classification Search
None
See application file for complete search history.

(56) References Cited

U.S. PATENT DOCUMENTS

| | | | |
|---|---|---|---|
| 9,501,100 B2 * | 11/2016 | Louboutin | ............ G06F 1/1632 |
| 2012/0163520 A1 * | 6/2012 | Liu | ........................ G01S 5/0018 |
| | | | 375/356 |

(Continued)

OTHER PUBLICATIONS

"International Search Report and Written Opinion Issued in PCT Application No. PCT/US2016/016592", dated May 10, 2016, 10 Pages.

*Primary Examiner* — Qing Yuan Wu
(74) *Attorney, Agent, or Firm* — Jonathan M. Waldman

(57) ABSTRACT

Example apparatus and methods concern a first off-the-shelf device (e.g., game console, laptop) that may lack a sensor interacting with a second off-the-shelf device(s) (e.g., smart phone, tablet) that has a sensor. The first device may ask remote devices to expose sensors, may select a remote device and sensor to work with, may control communications between the devices and may use the sensor data provided by the second data to run an application on the first device. The application may be acquired from a consumer-oriented application repository, may require sensor data, and may run unmodified on the first device due to the availability of the sensor data from the second device. The combination of devices improves the capability of the first device, saves energy, and reduces computing complexity. A game console or application written for the game console may perform better using sensor data from a remote device.

21 Claims, 10 Drawing Sheets

(51) Int. Cl.
*H04Q 9/00* (2006.01)
*H04W 4/80* (2018.01)
*H04W 52/02* (2009.01)

(56) References Cited

U.S. PATENT DOCUMENTS

2012/0289354 A1* 11/2012 Cottam .............. A63B 69/3658
    473/223
2013/0194374 A1    8/2013 Kieft et al.
2013/0335226 A1* 12/2013 Shen ...................... H04R 5/033
    340/573.1

* cited by examiner

SENSOR DATA AVAILABILITY FROM REMOTE DEVICES

BACKGROUND

Thermometers are interesting and useful devices. Thermometers let us understand the temperature and react accordingly in our daily lives by, for example, adding a layer of clothing or turning on the furnace. Thermometers also let us react accordingly in industry by, for example, controlling baking processes, curing processes, and other processes. Computers are also interesting and useful devices. Computers let us automate many tasks and have allowed the introduction of many productivity related applications, games, industrial processes, and manufacturing processes. Thermometers and computers have been paired to improve manufacturing processes by, for example, monitoring the temperature in an oven used for a rubber curing process. But not every computer has a thermometer. Thus, only computers that specifically included a thermometer may have been useful for certain temperature related applications.

Conventionally, sensors including thermometers, accelerometers, or gyroscopes were built into an apparatus that had a specific need for that sensor. Information transfer between a sensor and a processor in the apparatus may have been achieved through a custom purpose-built interface for a specific purpose. For example, an accelerometer or gyroscope in a smart phone may have provided information that could be used by the phone to determine whether the phone ought to display information in a portrait mode or in a landscape mode. The accelerometer or gyroscope in the smart phone may have provided data that was only visible to the smart phone and only usable by the smart phone.

If a computing device like a game console or smart phone did not have a particular sensor, then it may have been difficult, if even possible at all, for that computing device or an application running on the computing device to use sensor information. However, many applications are now developed with the expectation that certain sensor data will be available. When that data is not available, the application may not operate properly. Thus, application developers may have been burdened to provide multiple versions of applications, some of which operated with devices having built-in sensors and some of which operated on devices without built-in sensors. This increased manufacturing complexity, distribution complexity, and inventory control complexity, which in turn increased costs. Additionally, a computing device may only need a sensor occasionally. Building a sensor into a device when that sensor is only used occasionally may have added unnecessary cost to the host device. Additionally, powering the sensor even though it is rarely used may have wasted electricity or power.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods improve over conventional approaches by facilitating injecting sensor data from remote computing devices into computing devices that do not have sensors on an as-needed basis. The sensor data may be moved by handlers on the two separate devices and may move operating system to operating system, application to operating system, or in other ways. A device without a sensor may broadcast a request asking other devices to expose their sensors or sensor data. If an appropriate sensor is available, the two devices may establish a communication link that facilitates providing the sensor data.

Example apparatus and methods may establish a relationship between a first device (e.g., game console) and one or more second devices (e.g., smart phone) that have one or more sensors (e.g., accelerometer, gyroscope) that are not available on the first device. When sensor data is available from a remote device, the game console may be able to run an application that requires sensor data even though the console does not produce the required type of sensor data.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
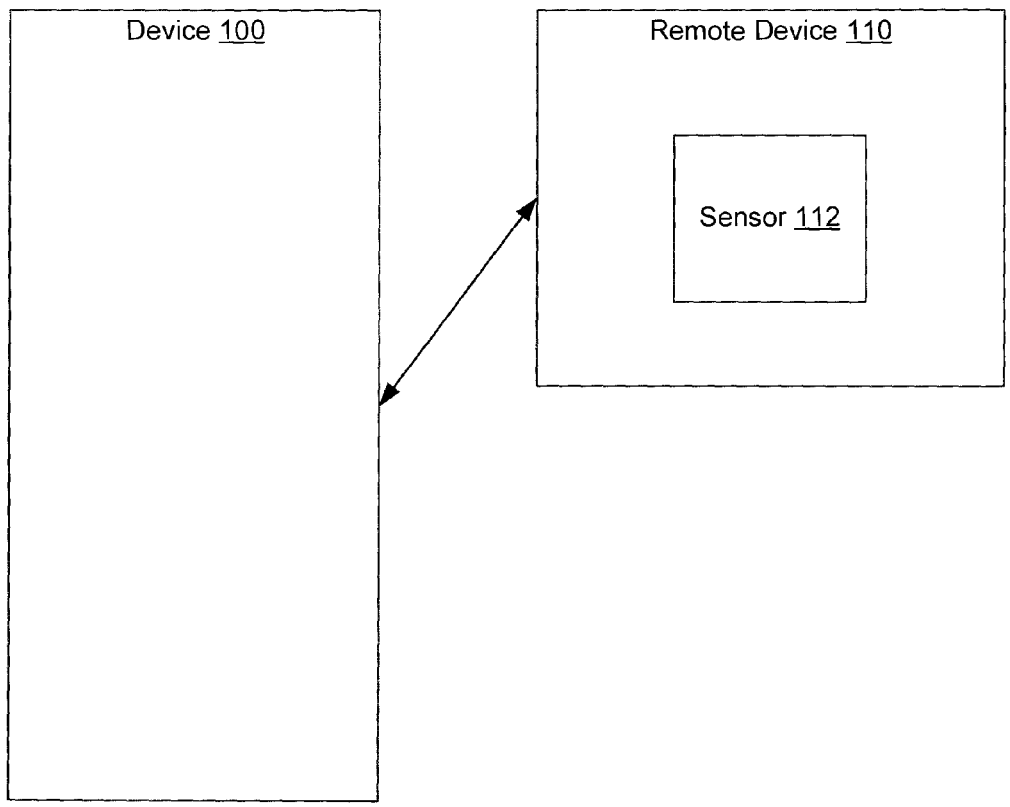
FIG. 1 illustrates an example first device that does not have a sensor interacting with an example second device that does have a sensor.

Not every device has to have every sensor known to man. Example apparatus and methods facilitate using sensor data available at one computing device (e.g., smart phone) in another computing device (e.g., game console). Example apparatus and methods may provide a sensor application programming interface (API) for a first device running a first operating system or application that facilitates discovering and interacting with sensors running on other computing devices (e.g., smart phone) that are running other operating systems or applications. For example, a game console may not have a built in accelerometer or gyroscope. However, a person playing a game on the game console may have a smart phone that does have an accelerometer or gyroscope. Example apparatus and methods facilitate the game console discovering and interacting with the smart phone and its sensors. The game console may be an "off-the-shelf" game console that runs without modification. Similarly, the smart phone may be an "off-the-shelf" phone that runs without modification. The off-the-shelf smart phone may provide sensor data to the off-the-shelf game console and that sensor data may be used without having to update the game console hardware or game console operating system. Similarly, the smart phone may provide the sensor data without having to update the smart phone hardware or smart phone operating system. This functionality is provided by providing a mechanism for applications written by different authors to access both locally and remotely connected sensors in a consistent fashion. In one embodiment, an executing process or circuit may provide an interface for communicating sensor data from the smart phone or other computing device to the game console or other computing device. Making the sensor data that is available at the smart phone available to the game console may facilitate having an application (e.g., video game) running on the console surface an appropriate user experience based, at least in part, on the sensor data.

Consider the following scenario where a user downloads and installs an application (e.g., video game) from a consumer oriented application store. The application may be, for example, a driving game that uses tilting motions to steer a vehicle. The game console may not have an accelerometer and gyroscope to support the tilting motions. However, a smart phone may have an accelerometer and gyroscope that could support the tilting motions. Example apparatus, methods, and systems facilitate using the downloaded application in its sensor-driven mode without changing the game console hardware or the smart phone hardware. Example apparatus, methods, and systems also facilitate using the downloaded application in its sensor-driven mode without changing the operating system on either the game console or the smart phone. At a second point in time, the user may buy a new phone that has a different accelerometer and gyroscope and that has different hardware and operating system. Example apparatus, methods, and systems would allow the user to still use the downloaded application on the game console and receive the sensor data from the new smart phone.

Example apparatus and methods facilitate producing applications (e.g., video games) for a computing device (e.g., game console, laptop, all-in-one personal computer) that does not have built-in sensors (e.g., accelerometer, gyroscope) but that will have access to a remote device(s) (e.g., smart phone, tablet) that does have built-in sensors. This relieves the burden on application developers to produce multiple versions of an application. This also relieves the burden on distribution and inventory control. This also facilitates reducing the cost of devices (e.g., game console) by allowing sensors to be located external to the device in, for example, a smart phone or other mobile device.

While a game console has been described, more generally, a computing device that runs an operating system and an application may receive sensor data from another computing device that runs an operating system and an application. Example apparatus, methods, and protocols facilitate running unmodified sensor-based applications on a device that does not have sensors.

FIG. 1 illustrates a device 100 that does not have a sensor interacting with a remote device 110 that does have a sensor 112. The device 100 may be, for example, a game console or low-end laptop computer. The remote device 110 may be, for example, a smart phone or tablet computer. The sensor 112 may be, for example, an accelerometer or a gyroscope. The sensor 112 may also be, for example, a vendor defined sensor. The vendor defined sensor may be, for example, a thermometer, a barometer, a light meter, a sound meter, or other sensor. The device 100 may be an "off-the-shelf" device (e.g., game console) that runs without having to modify its hardware or operating system. Similarly, the remote device 110 may be an "off-the-shelf" device (e.g., smart phone) that runs without having to modify its hardware or operating system. The off-the-shelf smart phone may provide sensor data to the off-the-shelf game console and that sensor data may be used without having to update the game console hardware or game console operating system. Similarly, the smart phone may provide the sensor data without having to update the smart phone hardware or smart phone operating system.

Figure 2:
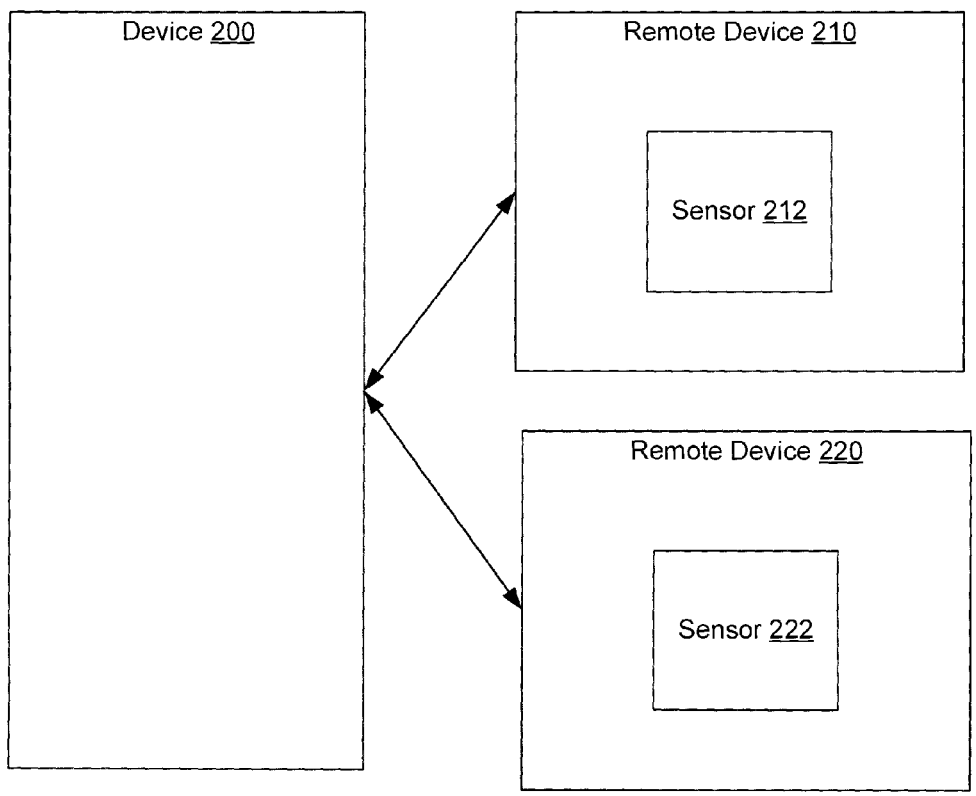
FIG. 2 illustrates an example first device that does not have a sensor interacting with two different second devices having sensors.

FIG. 2 illustrates a device 200 that does not have a sensor interacting with two different remote devices having sensors. A first remote device 210 may have a first sensor 212 and a second remote device 220 may have a second sensor 222. While a single sensor 212 and a single sensor 222 are illustrated, a remote device may have one or more sensors. In one embodiment, the device 200 may be a game console, a laptop, or PC, and the first remote device 210 and the second remote device 220 may be the same type of devices (e.g., smart phones, tablets) that users are using to play a video game on the game console. The video game may be a collaborative driving game (e.g., car racing game) that requires inertial data from the devices being used as game controllers to turn the cars. In this embodiment, sensor 212 may be an accelerometer or gyroscope and sensor 222 may be an accelerometer or gyroscope that provide data that the application running on device 200 may use to control steering the cars for the respective players.

Figure 3:
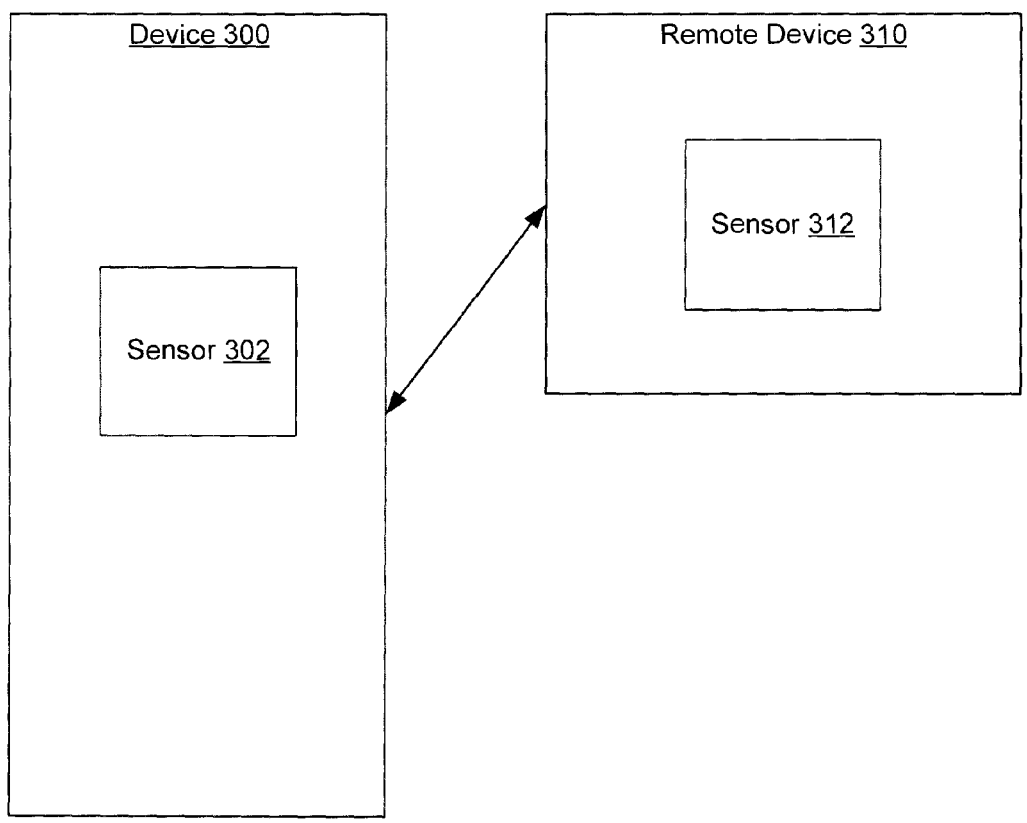
FIG. 3 illustrates an example first device that has a sensor interacting with a second device that also has a sensor.

FIG. 3 illustrates an example device 300 that has a sensor 302 interacting with a remote device 310 that also has a sensor 312. Sensor 302 and sensor 312 may be the same type of sensor. In one embodiment, device 300 may seek data from sensor 312 to confirm readings acquired from sensor 302. Sensor 302 and sensor 312 may be different types of sensors. In one embodiment, device 300 may seek data from sensor 312 because sensor 302 is not providing the desired sensor data. In one embodiment, device 300 may selectively power down or ignore inputs from sensor 302 upon determining that data from sensor 312 is available. Selectively powering down sensor 302 may facilitate preventing a confusing situation where a sensor on one device causes an unexpected result on another device. For example, an accelerometer or gyroscope on a tablet could cause the screen to unexpectedly rotate on a laptop computer.

Figure 4:
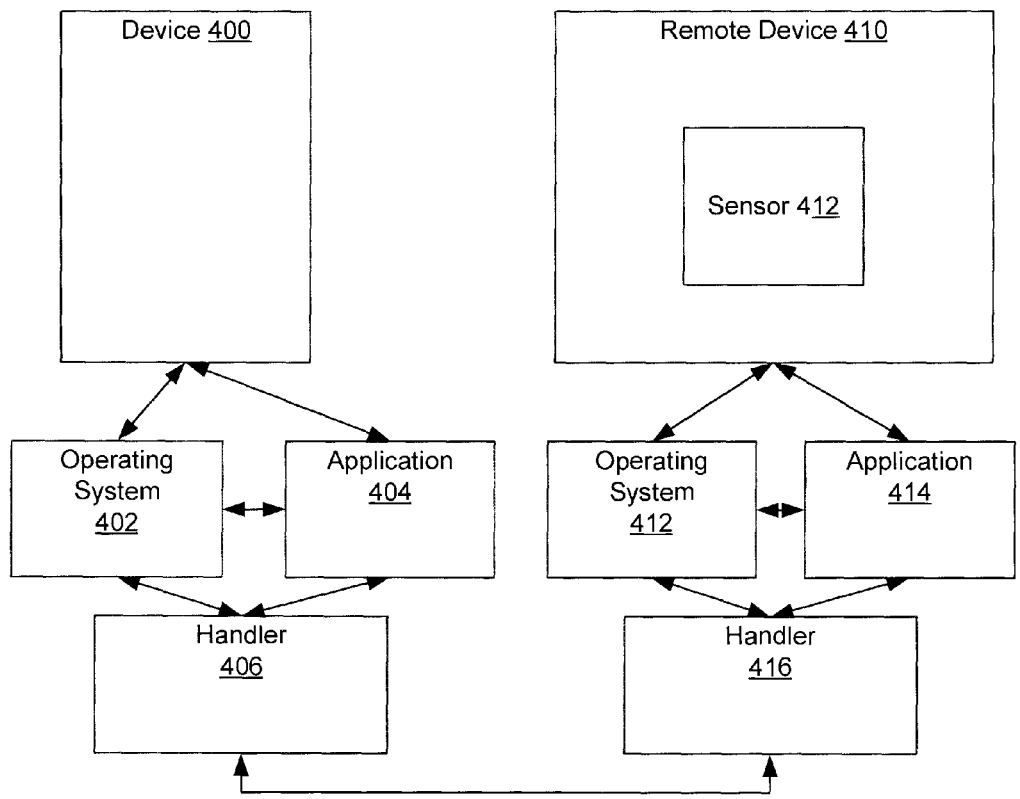
FIG. 4 illustrates an example first device that does not have a sensor interacting with an example second device that has a sensor.

FIG. 4 illustrates a device 400 that does not have a sensor interacting with a remote device 410 that has a sensor 412. FIG. 4 provides additional detail on how the two devices may communicate. Device 400 may run an operating system 402 and application 404. Similarly, remote device 410 may run an operating system 412 and an application 414. While single operating systems and single applications are illustrated on each of device 400 and remote device 410, multiple operating systems or applications may be run. Device 400 may include a handler 406 and remote device 410 may include a handler 416. The handlers may implement a protocol between the devices. The protocol may describe how to request that sensors are exposed, how to expose a sensor, how to request sensor data, how to provide sensor data, how to request that a sensor be powered down, or other actions. The handlers may implement a secure peer-to-peer communication channel between the devices. In different embodiments, handler 406 and handler 416 may cause data from sensor 412 to travel between operating system 412 and operating system 402, between application 414 and application 404, or in other ways. In different embodiments, handler 406 or handler 416 may be processes, circuits, or a combination thereof.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
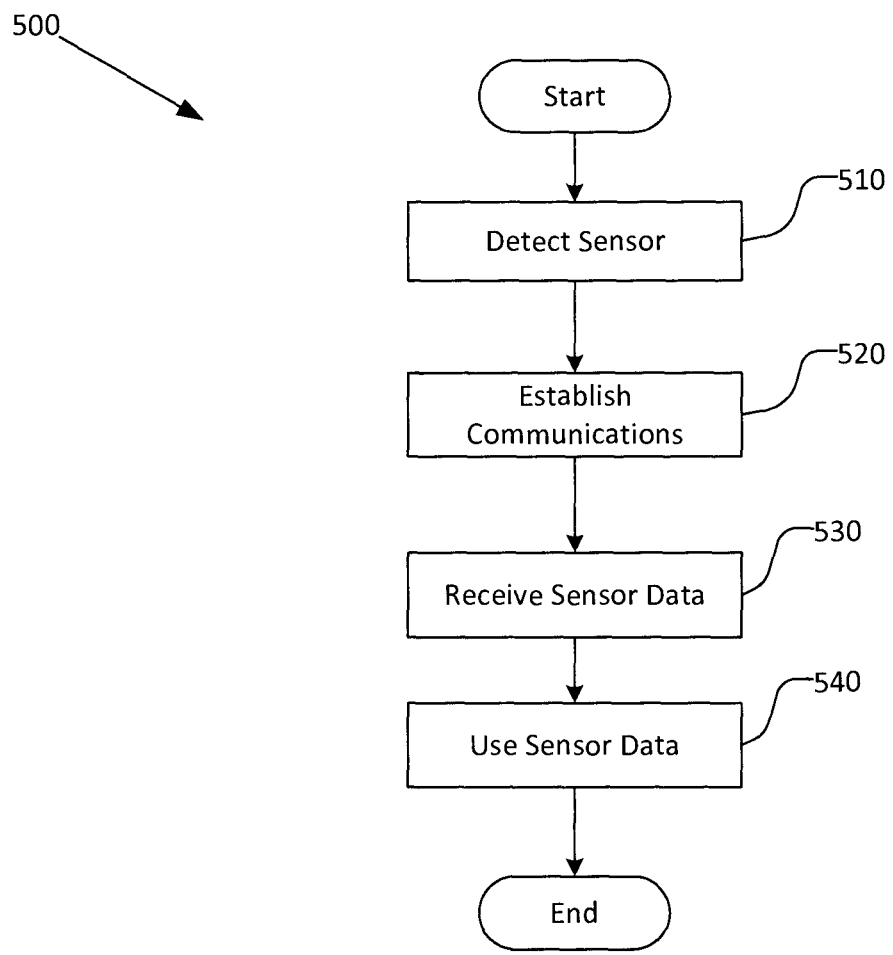
FIG. 5 illustrates an example method associated with a first device interacting with an example second device that has a sensor.

FIG. 5 illustrates an example method 500 for running an unmodified sensor-dependent application on a local device without using sensor data from the local device. The local device may be, for example, a game console or laptop computer that does not have certain sensors. The remote device may be, for example, a smart phone or a tablet computer. Method 500 includes, at 510, detecting an exposed sensor that is available on a remote device. A remote device may decide whether to expose its sensors or to expose data produced by those sensors. The remote device may change its decision concerning exposing sensors or data. When the sensor on the remote device is exposed, the local device may detect the sensor and seek to interact with the sensor. The sensor may be, for example, an accelerometer, a gyroscope, or a vendor defined sensor such as a thermometer, a barometer, a light meter, or a sound meter.

Method 500 includes, at 520, establishing a communication link with the remote device. Establishing the communication link may include, for example, establishing a wired link or a wireless link. The wired link may be established using, for example, a USB (universal serial bus) interface, Ethernet, or other interface. The wireless link may be established using, for example, a Bluetooth interface, an NFC (near field communication) interface, WiFi, or other interface. A Bluetooth interface facilitates exchanging data over short distances using short-wavelength microwave transmission in the ISM (Industrial, Scientific, Medical) band.

In one embodiment, establishing the communication link at 520 includes establishing a peer-to-peer communication link between the local device and the remote device. The peer-to-peer link may be established using, for example, near field communications. In one embodiment, establishing the communication link at 520 includes establishing an application-to-application link between an application on the local device and an application on the remote device or establishing an operating system to operating system link between an operating system on the local device and an operating system on the remote device. Different types of communication links may be established.

In one embodiment, establishing the communication link at 520 includes controlling a handler on the local device and controlling a handler on the remote device. The handlers may be processes, ASICs, circuits, or other computer hardware. The handler on the local device and the handler on the remote device may manage communication actions including requesting sensor data, packaging sensor data, transferring sensor data, unpacking sensor data, or writing sensor data.

Method 500 also includes, at 530, receiving sensor data from the exposed sensor. As described below in connection with FIG. 6, the sensor data may be received using a pull model, a push model, or other model. The sensor data may be associated with an accelerometer, a gyroscope, a vendor defined sensor (e.g., thermometer, barometer, light meter, sound meter), or other meter.

Method 500 also includes, at 540, using the sensor data in the sensor-dependent application. In one embodiment, using the sensor data may include controlling the sensor-dependent application to surface a user experience based, at least in part, on the sensor data. The user experience may be associated with a video game and thus the user experience that is surfaced may depend on which sensors and thus, which sensor data, if any, are available to the video game. For example, if sensor data associated with a gyroscope and accelerometer are available, the video game may be able to represent complicated three dimensional movements by a user. If sensor data associated with just an accelerometer are available, the video game may be able to represent two dimensional movements by a user. If sensor data available with an electro cardio gram (ECG) or other bio-information are available, then the video game may be able to respond to a user's physiological response to a scene. Thus, the user experience that is made available by the video game can be made more rich as different types and amounts of sensor data become available.

Figure 6:
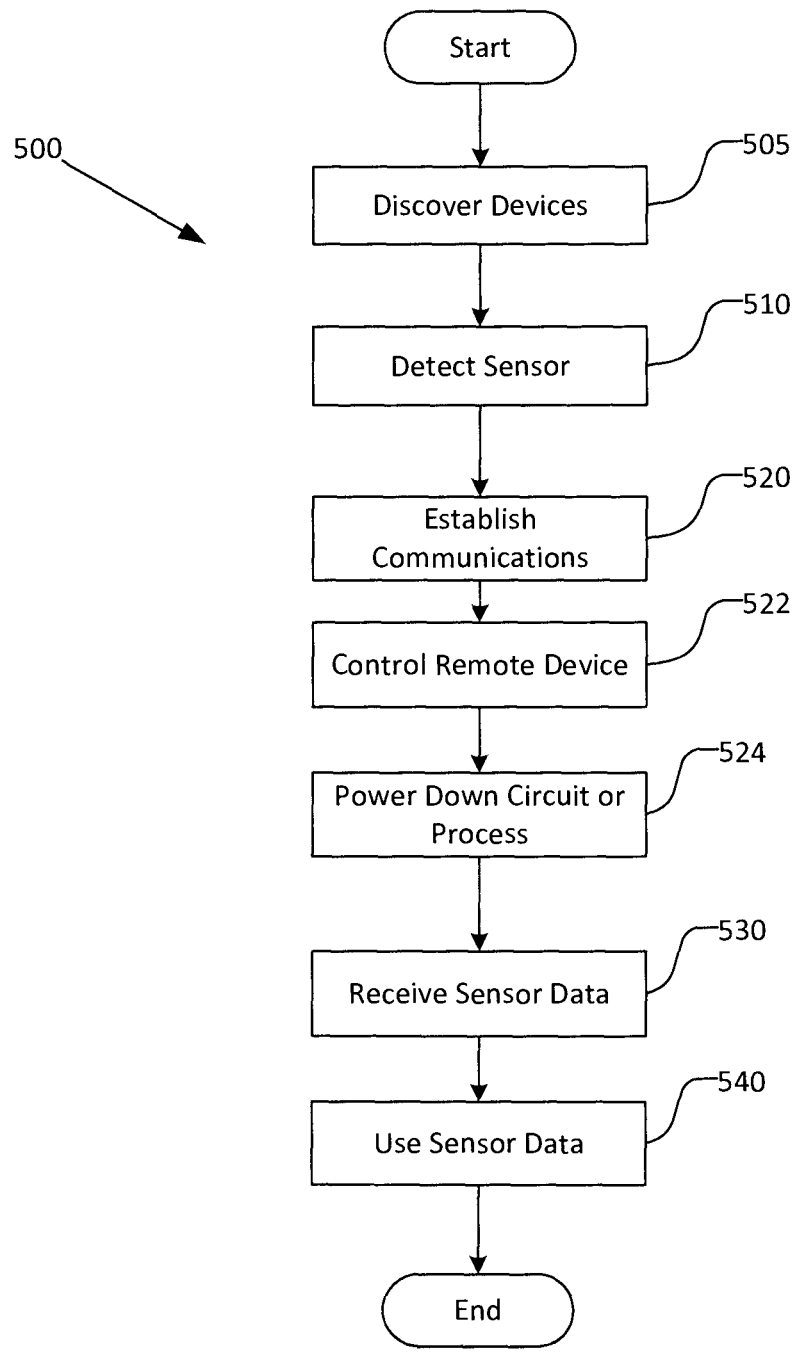
FIG. 6 illustrates an example method associated with a first device interacting with an example second device that has a sensor.

FIG. 6 illustrates another embodiment of method 500. This embodiment includes additional actions. For example, this embodiment includes, at 505, discovering devices. Discovering devices may involve sending out communications to discover sensors or remote devices with sensors. The discoverability phase may include identifying whether a specific device or a specific sensor is available. The discoverability phase may also include identifying whether any device or any sensor is available. Thus, in one embodiment, method 500 may include, at 505, transmitting a request to the remote device to expose a specific sensor available on the remote device. In another embodiment, method 500 may include, at 505, broadcasting a request to one or more remote devices to expose one or more sensors available on the one or more remote devices. In one situation, the request is sent to a specific device while in another situation a broadcast is sent to any devices that may be relevant. Devices that receive the request may choose to expose their sensors or sensor data.

This embodiment of method 500 also includes, at 522, controlling a remote device to provide data. In one embodiment, the control may be passive where the local device sends a request for sensor data to the remote device. In another embodiment, the control may be active where the local device sends a command to the remote device for sensor data. Whether the local device makes a request or demand may be controlled, at least in part, by the protocol established by the handlers on the local device and the remote device.

This embodiment of method 500 also includes, at 524, selectively powering down a sensor. Method 500 may include controlling the remote device to selectively power down a circuit or process associated with a sensor on the remote device. The sensor may be powered down if the application running on the local device doesn't need data from that type of sensor or from that specific sensor at a specific time. Powering down a sensor may save energy. Method 500 may also include controlling the local device to selectively power down a circuit or process associated with a sensor on the local device. For example, if both a game console and a smart phone that is interacting with the game console have an accelerometer, and if a user is using the smart phone to interact with the console, then the accelerometer on the console may be powered down.

While FIGS. 5 and 6 illustrate various actions occurring in serial, it is to be appreciated that various actions illustrated in FIGS. 5 and 6 could occur substantially in parallel. By way of illustration, a first process could control discoverability, a second process could control communications, and a third process could control surfacing an appropriate user experience based on sensor data that is communicated from discovered sensors. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer, phone, tablet) cause the machine to perform methods described or claimed herein including method 500. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 7:
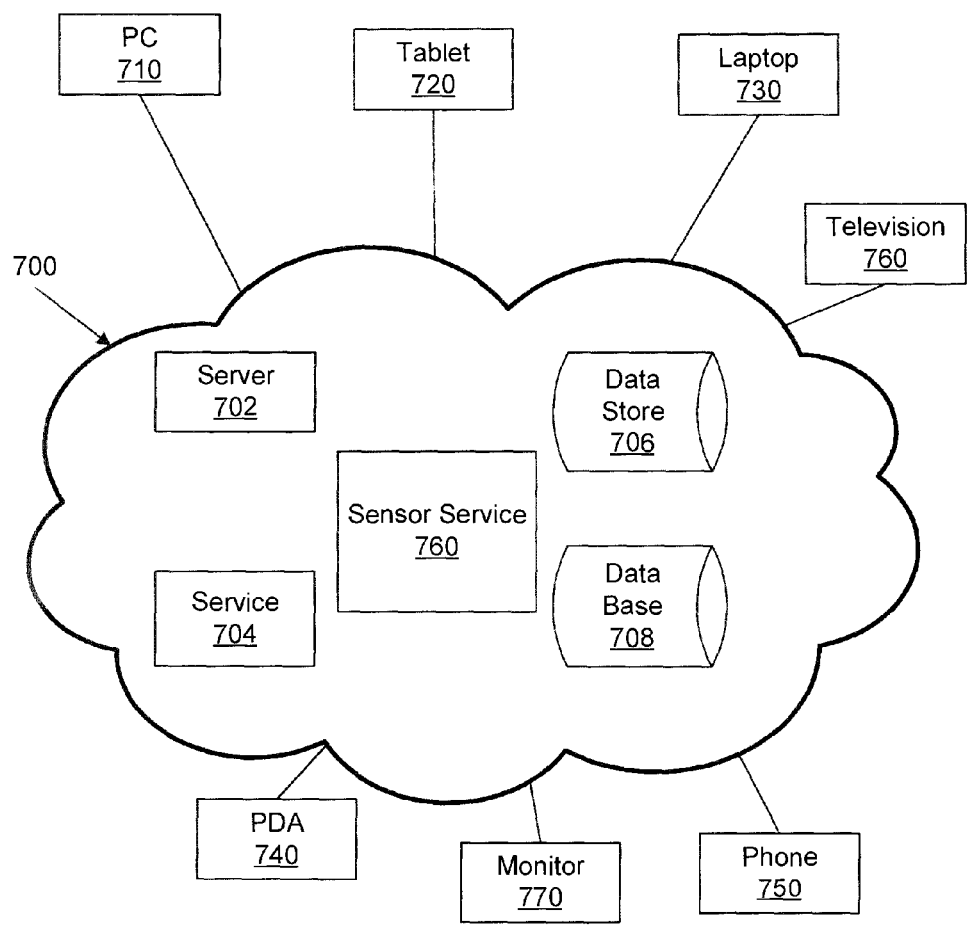
FIG. 7 illustrates an example cloud operating environment in which a first device may interact with an example second device that has a sensor.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example sensor service 760 residing in the cloud 700. The sensor service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud 700 and may, therefore, be used by the sensor service 760.

FIG. 7 illustrates various devices accessing the sensor service 760 in the cloud 700. The devices include a computer 710, a tablet 720, a laptop computer 730, a desktop monitor 770, a television 760, a personal digital assistant 740, and a mobile device (e.g., cellular phone, satellite phone) 750. It is possible that different users at different locations using different devices may access the sensor service 760 through different networks or interfaces. In one example, the sensor service 760 may be accessed by a mobile device 750. In another example, portions of sensor service 760 may reside on a mobile device 750. Sensor service 760 may perform actions including, for example, requesting that devices expose their sensors, identifying exposed sensors, establishing communications, transferring sensor data, surfacing appropriate user experiences, or other actions. In one embodiment, sensor service 760 may perform portions of methods described herein (e.g., method 500, method 600).

Sensor service 760 may, for example, accept sensor data from a first device (e.g., tablet 720) and provide the sensor data to a second device (e.g., laptop computer 730) for processing. Different combinations of devices may generate inputs, process data, and provide outputs. Sensor service 760 facilitates producing lower cost devices that may have fewer components (e.g., less sensors) and that therefore consume less electricity or power. Sensor service 760 facilitates using components with superior sensor capabilities but lower costs and power consumption.

Figure 8:
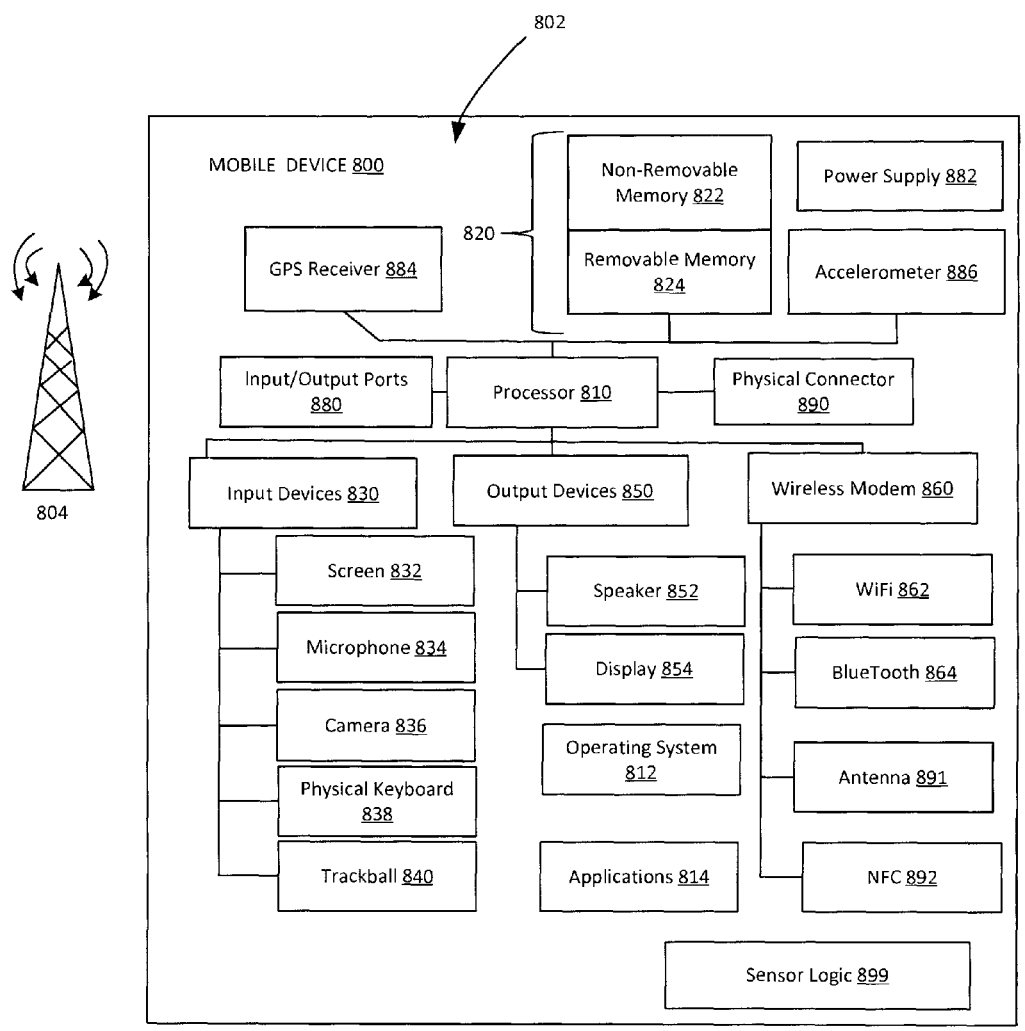
FIG. 8 is a system diagram depicting an exemplary mobile communication device that has a sensor.

FIG. 8 is a system diagram depicting an exemplary mobile device 800 that includes a variety of optional hardware and software components shown generally at 802. Components 802 in the mobile device 800 can communicate with other components, although not all connections are shown for ease of illustration. The mobile device 800 may be a variety of computing devices (e.g., cell phone, smartphone, tablet, phablet, handheld computer, Personal Digital Assistant (PDA), etc.) and may allow wireless two-way communications with one or more mobile communications networks 804, such as a cellular or satellite networks. Example apparatus may concentrate processing power, memory, and connectivity resources in mobile device 800 with the expectation that mobile device 800 may be able to interact with other devices (e.g., tablet, monitor, keyboard) and provide those other devices with sensor data.

Mobile device 800 can include a controller or processor 810 (e.g., signal processor, microprocessor, application specific integrated circuit (ASIC), or other control and processing logic circuitry) for performing tasks including input event handling, output event generation, signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), video games, movie players, television players, productivity applications, or other applications. Mobile device 800 may selectively expose sensor data to a requesting external device or service.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include accelerometer data, gyroscope data, thermometer data, barometer data, light intensity data, sound intensity data, control event data, web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment. The memory 820 may be sufficient to store sensor data that may then be provided to an external component (e.g., game console, laptop computer) on request.

The mobile device 800 can support one or more input devices 830 including, but not limited to, a screen 832 that is both touch and hover-sensitive, a microphone 834, a camera 836, a physical keyboard 838, or trackball 840. The mobile device 800 may also support output devices 850 including, but not limited to, a speaker 852 and a display 854. Display 854 may be incorporated into a touch-sensitive and hover-sensitive i/o interface. Other possible input devices (not shown) include accelerometers (e.g., one dimensional, two dimensional, three dimensional), gyroscopes, thermometers, barometers, light meters, and sound meters. Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting touch and hover gestures associated with controlling output actions on a secondary display.

A wireless modem 860 can be coupled to an antenna 891. In some examples, radio frequency (RF) filters are used and the processor 810 need not select an antenna configuration for a selected frequency band. The wireless modem 860 can support one-way or two-way communications between the processor 810 and external devices. The communications may concern sensor data that is provided as controlled, at least in part, by sensor logic 899. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/ output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a sensor logic 899 that provides a functionality for the mobile device 800 and for interacting with external components (e.g., tablet, game console). For example, sensor logic 899 may provide a client for interacting with a service (e.g., service 760, FIG. 7). Portions of the example methods described herein may be performed by sensor logic 899. Similarly, sensor logic 899 may implement portions of apparatus described herein. In one embodiment, sensor logic 899 may detect a request to expose sensor data, may participate in establishing a secure communication channel with the requester, and may provide sensor data to the requester.

Figure 9:
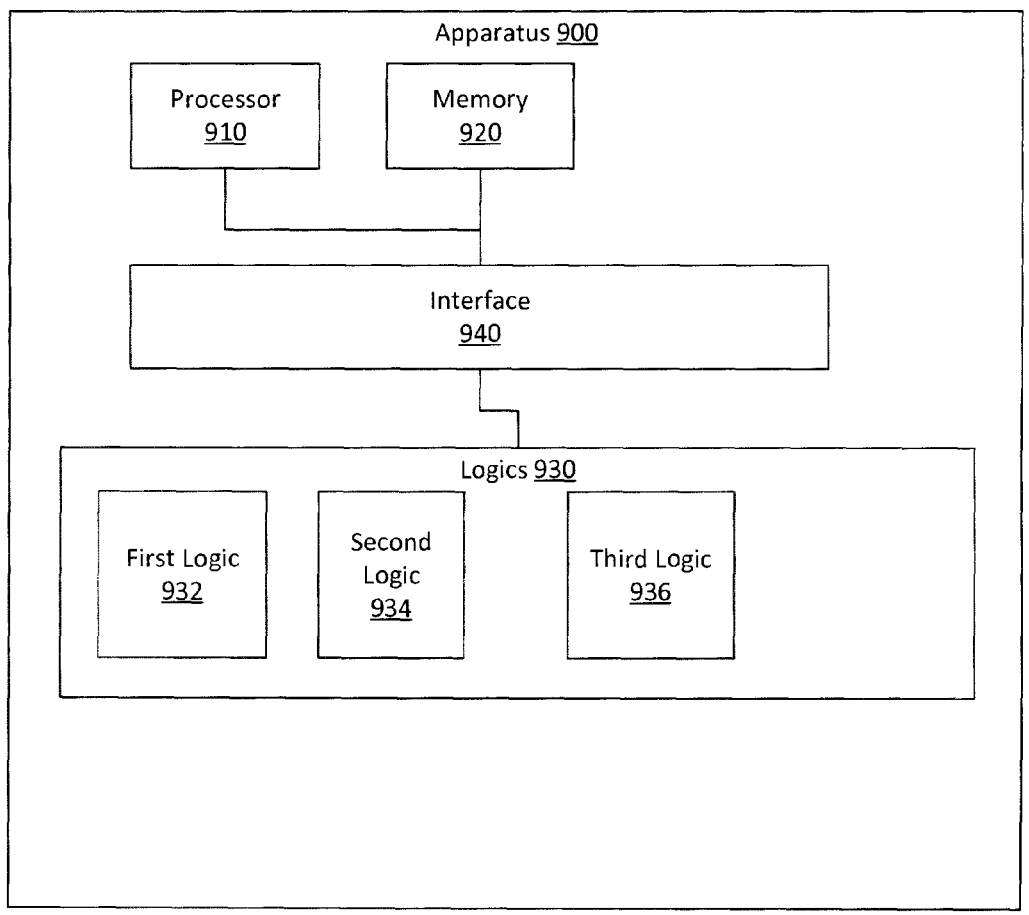
FIG. 9 illustrates an example apparatus that does not have a sensor but interacts with an example second device that does have a sensor.

FIG. 9 illustrates an apparatus 900 that may interact with another apparatus to acquire sensor data that may not otherwise be available to apparatus 900. Apparatus 900 may be, for example, a game console, a laptop, or other computing device. In one example, the apparatus 900 includes a physical interface 940 that connects a processor 910, a memory 920, and a set of logics 930. The set of logics 930 may facilitate acquiring data from a sensor on a remote device (e.g., phone, tablet). Elements of the apparatus 900 may be configured to communicate with each other, but not all connections have been shown for clarity of illustration.

Apparatus 900 may include a first logic 932 that controls detecting the sensor available on the remote device. In one example, first logic 932 may detect a sensor in response to a specific request to a specific device concerning a specific sensor. In another example, first logic 932 may detect a sensor in response to a broadcast request to any devices in range of apparatus 900. The broadcast request may concern a specific type of sensor or may concern a generic request for sensors. The requests may ask a remote device(s) to expose sensors. Exposing a sensor may involve allowing other devices to acquire data produced by the sensor. The first logic 932 may detect the sensor on the remote device when the sensor is exposed. The sensor may be, for example, an accelerometer, a gyroscope, a thermometer, a barometer, a light meter, a sound meter, or other sensor.

Apparatus 900 may include a second logic 934 that controls communication of sensor data between the remote device and the apparatus 900. The second logic 934 may cause sensor data to be communicated for the sensor using a peer-to-peer approach, an operating system to operating system approach, an application to application approach, or other approach. The second logic 934 may cause sensor data to be provided using a request/response method where the remote device sends data only when requested or using a push method where the remote device automatically sends sensor data. The second logic 934 may provide an API with which applications can interact to access executable code or circuits.

Apparatus 900 may include a third logic 936 that controls a user experience provided by the apparatus 900. The user experience may depend, at least in part, on the sensor data. For example, the user experience may involve movement of an object associated with the user. For example, an object (e.g., car, airplane) may move in response to the sensor data. The user experience may also involve transitions between scenes experienced by the user. For example, the scenery that is displayed to a user may depend on which direction a user is looking, which may be determined from a current position and a movement of the user. Thus, the user experience may depend on an awareness of a movement of the remote device as sensed by the sensor. Thus, the third logic 936 may control elements of a user experience including, for example, the number of dimensions in which control is provided, the number of dimensions in which a user may appear to move, or other attributes.

Apparatus 900 may provide superior results when compared to conventional systems because sensor data that might not otherwise be available to an application running on apparatus 900 may be available, which provides a user experience more suitable for suspending disbelief or achieving user immersion.

Apparatus 900 may include a memory 920. Memory 920 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 920 may be configured to store sensor data, protocol data, or other data.

Apparatus 900 may include a processor 910. Processor 910 may be, for example, a signal processor, a microprocessor, an application specific integrated circuit (ASIC), or other control and processing logic circuitry for performing tasks including signal coding, data processing, input/output processing, power control, or other functions.

In one embodiment, the apparatus 900 may be a general purpose computer that has been transformed into a special purpose computer through the inclusion of the set of logics 930. Apparatus 900 may interact with other apparatus, processes, and services through, for example, a computer network.

In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs).

Figure 10:
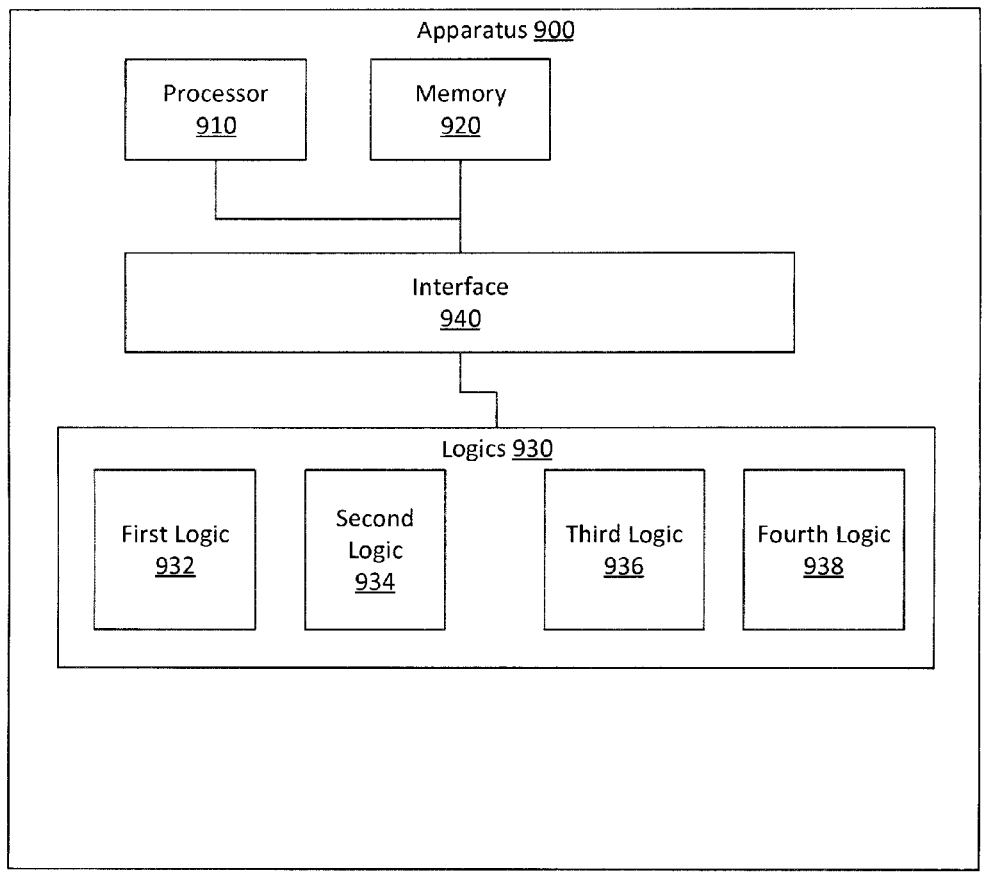
FIG. 10 illustrates an example apparatus that does not have a sensor but interacts with an example second device that does have a sensor.

FIG. 10 illustrates another embodiment of apparatus 900. This embodiment of apparatus 900 includes a fourth logic 938 that controls selectively powering down the sensor on the remote device or a sensor on the apparatus 900. A sensor may be powered down when, for example, it is determined that the sensor on the remote device or the sensor on the apparatus 900 is not needed for the user experience. Powering down a sensor may reduce power consumption and reduce programming complexity. Consider a scenario where both a local device and a remote device have the same type of sensor (e.g., accelerometer, gyroscope). When two similar sensors are available, only one may be needed. Therefore, the second sensor may be powered down to avoid redundancy and to prevent unexpected results. This may facilitate preventing an unexpected result where a screen on one device (e.g., PC) would be rotated when a user rotates another device (e.g., phone).

In one embodiment, apparatus 900 may be a laptop or all-in-one personal computer (PC) and may be part of a system with a smart phone. The system may include a laptop or PC running an operating system and an application that requires data provided from an accelerometer or gyroscope. The unmodified application may originally have been designed for a tablet or phone that were assumed to have an accelerometer and gyroscope. The system may include a smart phone running an operating system and an application. The smart phone may include an accelerometer or gyroscope. In this system, the laptop or PC or other device that does not have a certain sensor uses data provided by the accelerometer or the gyroscope on the smart phone to run the application in an unmodified mode. Running in an unmodified mode means that the application can run with sensor data even though the host device (e.g., laptop, PC) doesn't have appropriate sensors for producing the sensor data. If the sensor data was not available, then the application might have to run in a modified mode having less capability or providing a less rich user experience.

Aspects of Certain Embodiments

In one embodiment, an apparatus includes a processor, a memory, and a set of logics. The apparatus may include a physical interface to connect the processor, the memory, and the set of logics. The set of logics includes a first logic that that controls detecting the sensor available on the remote device. The set of logics also includes a second logic that controls communication of sensor data between the remote device and the apparatus. The set of logics also includes a third logic that controls a user experience provided by the apparatus. The apparatus may also include a fourth logic that controls selectively powering down the sensor on the remote device or a sensor on the apparatus.

In another embodiment, a system includes a game console running an operating system and an application that requires data provided from an accelerometer or gyroscope. The system may include a smart phone running an operating system and an application. The smart phone may include an accelerometer or gyroscope. In this system, the game console uses data provided by the accelerometer or the gyroscope on the smart phone to run the application in an unmodified mode.

In another embodiment, a method is performed on a computing device running an operating system and an application. The method may include detecting an exposed sensor available on a remote device and establishing a communication link with the remote device. Once the communication link is established, the method may include receiving sensor data from the exposed sensor, and using the sensor data in the sensor-dependent application. In one embodiment, the method may include sending out a request that will cause a device to expose a sensor.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for running an unmodified sensor-dependent application on a local off-the-shelf device without using sensor data from the local off-the shelf device, without modifying hardware of the local off-the-shelf device, and without modifying an operating system on the local off-the-shelf device, the method comprising:
  acquiring the unmodified sensor-dependent application from a consumer-oriented application repository;
  transmitting a request to a remote device to expose a specific sensor available on the remote device;
  detecting an exposed sensor available on the remote device;
  establishing a communication link with the remote device;
  receiving sensor data from the exposed sensor, and
  using the sensor data in the unmodified sensor-dependent application running on the local off-the-shelf device.

2. The method of claim 1, where the remote device is an off-the-shelf device, an embedded device, or a prototype device.

3. The method of claim 1, comprising broadcasting a request to one or more remote devices to expose one or more sensors available on the one or more remote devices.

4. The method of claim 1, comprising requesting sensor data from the remote device.

5. The method of claim 1, comprising controlling the remote device to provide sensor data.

6. The method of claim 1, where the sensor data is associated with an accelerometer or a gyroscope.

7. The method of claim 1, where the sensor data is associated with a vendor defined sensor.

8. The method of claim 7, where the vendor defined sensor is a thermometer, a barometer, a light meter, or a sound meter.

9. The method of claim 1, comprising controlling the sensor-dependent application to surface a user experience based, at least in part, on the sensor data.

10. The method of claim 1, comprising controlling the remote device to selectively power down a circuit or process associated with a sensor on the remote device.

11. The method of claim 1, where establishing the communication link includes establishing a peer-to-peer communication link between the local device and the remote device.

12. The method of claim 1, where establishing the communication link includes establishing an operating system to operating system link between an operating system on the local device and an operating system on the remote device or establishing an application to operating system link between an application on the local device and an operating system on the remote device.

13. The method of claim 1, where the local device is a game console or laptop computer and where the remote device is a smart phone or a tablet computer.

14. The method of claim 1, where detecting an exposed sensor available on a remote device includes detecting a plurality of exposed sensors available on one or more remote devices, and
where receiving sensor data from the exposed sensor includes receiving the sensor data from the plurality of exposed sensors.

15. The method of claim 1, comprising:
distinguishing the exposed sensor from a local sensor on the local off-the-shelf device and selectively controlling the sensor-dependent application to use sensor data from the exposed sensor or to use sensor data from the local sensor.

16. An apparatus, comprising:
a processor;
a memory;
a set of logics that facilitate acquiring data from a sensor on a remote device, and
a physical interface to connect the processor, the memory, and the set of logics, the set of logics comprising:
a first logic that controls detecting the sensor available on the remote device, where the first logic requests that the remote device exposes the sensor and detects the sensor on the remote device when the sensor is exposed;
a second logic that controls communication of sensor data between the remote device and the apparatus; and
a third logic that controls a user experience provided by the apparatus, where the user experience depends, at least in part, on the sensor data.

17. The apparatus of claim 16, where the second logic causes sensor data to be communicated for the sensor using a peer-to-peer approach, an operating system to operating system approach, or an application to operating system approach.

18. The apparatus of claim 17, where the sensor is an accelerometer, a gyroscope, a prototype sensor, a vendor defined thermometer, a vendor defined barometer, a vendor defined light meter, or a vendor defined sound meter.

19. The apparatus of claim 18, where the user experience involves movement of an object associated with the user or transitions between scenes experienced by the user, and where the user experience depends on an awareness of a movement of the remote device as sensed by the sensor.

20. The apparatus of claim 16, comprising a fourth logic that controls selectively powering down the sensor on the remote device or a sensor on the apparatus upon determining that the sensor on the remote device or the sensor on the apparatus is not needed for the user experience.

21. A system, comprising:
an off-the-shelf game console running a first off-the-shelf operating system and a first off-the-shelf application, where the first application requires data provided from an accelerometer or gyroscope, where the first application was acquired from a consumer-oriented data repository, and
an off-the-shelf smart phone running a second off-the-shelf operating system and a second off-the-shelf application, where the smart phone includes an accelerometer or gyroscope,
where the game console uses data provided by the accelerometer or the gyroscope on the smart phone to run the first application in an unmodified mode.

* * * * *